United States Patent
Park et al.

(10) Patent No.: US 8,010,736 B2
(45) Date of Patent: Aug. 30, 2011

(54) NONVOLATILE SEMICONDUCTOR MEMORY DEVICE FOR SUPPORTING HIGH SPEED SEARCH IN CACHE MEMORY

(75) Inventors: Chan-Ik Park, Seoul (KR); Jin-Wook Lee, Seoul (KR); Byoung-Kook Lee, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 781 days.

(21) Appl. No.: 12/029,665

(22) Filed: Feb. 12, 2008

(65) Prior Publication Data

US 2008/0195803 A1    Aug. 14, 2008

(30) Foreign Application Priority Data

Feb. 13, 2007  (KR) .................. 10-2007-0014716

(51) Int. Cl.
*G06F 12/00* (2006.01)
(52) U.S. Cl. .................. 711/103; 711/202; 711/221
(58) Field of Classification Search .................. 711/103, 711/202, 221
See application file for complete search history.

(56) References Cited

U.S. PATENT DOCUMENTS

| | | | |
|---|---|---|---|
| 5,907,856 A | 5/1999 | Estakhri et al. | |
| 7,613,876 B2 * | 11/2009 | Bruce et al. | 711/113 |
| 2004/0221130 A1 * | 11/2004 | Lai et al. | 711/203 |

FOREIGN PATENT DOCUMENTS

| | | |
|---|---|---|
| JP | 1129078 | 10/1999 |
| JP | 2004-086295 | 3/2004 |
| KR | 1999012215 | 2/1999 |
| KR | 10-0781196 | 11/2007 |

OTHER PUBLICATIONS

English Abstract for Publication No. 2004-086295.
English Abstract for Publication No. 10-2006-0129329 (for 10-0781196).

* cited by examiner

*Primary Examiner* — Matthew Bradley
(74) *Attorney, Agent, or Firm* — F. Chau & Associates, LLC

(57) ABSTRACT

A method for reducing a memory map table search time when employing a semiconductor memory device as a temporary memory of large capacity storage device, and a semiconductor memory device therefore, are provided. A MAP RAM is prepared for storing map table data related to the nonvolatile memory area in the volatile memory area. At an initial power-up operation, it is determined whether a logical address is searched for from the map table data while the map table data existing in a map storage area of the nonvolatile memory area is loaded into the MAP RAM. A physical address corresponding to the logical address is provided as an output, when the logical address is searched for. Search time for a memory map table is reduced and read performance in a high speed map information search is increased.

20 Claims, 4 Drawing Sheets

NONVOLATILE SEMICONDUCTOR MEMORY DEVICE FOR SUPPORTING HIGH SPEED SEARCH IN CACHE MEMORY

CROSS-REFERENCE TO RELATED APPLICATIONS

This application claims priority under 35 U.S.C. §119 to Korean Patent Applications 10-2007-0014716 filed on Feb. 13, 2007, the entire contents of which is hereby incorporated by reference.

BACKGROUND OF THE INVENTION

1. Technical Field

The present invention relates to nonvolatile semiconductor memory, and more particularly, to a nonvolatile semiconductor memory device for supporting a high-speed search in cache memory.

2. Discussion of the Related Art

Recent rapid development of information processing devices such as computers etc. have led to the development of semiconductor memory devices with high speeds and large capacities.

In general, a semiconductor memory device is classified as either a volatile semiconductor memory device or a nonvolatile semiconductor memory device. Examples of volatile semiconductor memory devices include dynamic random access memory and static random access memory.

An example of nonvolatile semiconductor memory device is an EEPROM. Modern EEPROM may be high density and electrically erasable. Moreover, modern applications for EEPROM often involve use in compact portable electronics such as digital cameras and portable computers, where a large amount of data may need to be stored in a relatively small device. Accordingly, EEPROMS having small sizes and high densities are desirable.

Flash EEPROM is classified as NAND, NOR and AND types. NAND-type EEPROMS utilizing a flash erase function may be particularly suited for use as large capacity auxiliary memory owing to their relatively high density as compared to NOR or AND-type EEPROMS.

A configuration of general nonvolatile semiconductor memory device, and a sectional face of memory cells in a memory cell array are disclosed in, for example, U.S. Pat. No. 6,295,227 issued on Sep. 25, 2001, which is incorporated by reference.

As flash memory becomes more highly integrated and higher speed, flash memory may be applied as a cache memory. Flash memory may be used as a temporary storage space of a large capacity of data storage device such as HDD etc. In such devices, NAND flash memory cell array and an SRAM memory are configured within a single chip, for example, the OneNAND fabricated by Samsung Electronics.

FIG. 1 illustrates an address mapping correlation between a large capacity storage device and a flash memory according to a conventional art.

A hard disk drive (HDD) 10 is a large capacity storage device having a data storage capacity of, i.e., 80 GB to 160 GB, and a OneNAND 100 having a flash memory internal structure is used as a cache memory. Though not shown in FIG. 1, an external host, i.e., micro controller, memory controller, CPU etc., first accesses the OneNAND 100 that functions as a cache memory in reading data stored in the HDD 10. The OneNAND 100 has a logical address and a physical address. Thus, the host first applies a logical address (step S2) to the OneNAND 100 in a data read request (step S1) and then receives a physical address mapped with the logical address from the OneNAND 100, thereby reading data.

As a result, as shown in FIG. 1, when the flash memory 100 is used as a temporary storage space of the large capacity storage device 10 like in the application to hybrid HDD, the host should decide whether there is read data in flash memory 100 serving as the temporary storage device, in a read request operation. This decision can be obtained by searching for a map table with storage of logical address among data stored in the flash memory 100. Time taken in the map table search lowers a read performance in the application for hybrid HDD.

FIG. 2 illustrates increased map search time in a read time according to a conventional art. A reference character A1 indicates a time interval of table map search, and A2 indicates a time interval of data transmission. With a data capacity of 128 to 256 MB as illustrated in FIG. 1, a data transmission time is about 70 microseconds, while, a table map search time is about 80 microseconds. When representing an overall read operation of FIG. 2 as a data transmission rate, the data transmission rate becomes 26.7 MB/S. As shown in an arrow AR1, the table map search time A1 may be reduced to A10.

SUMMARY OF THE INVENTION

Some exemplary embodiments of the present invention provide a nonvolatile semiconductor memory capable of supporting a cache read operation.

Some exemplary embodiments of the present invention provide a method of reducing a search time of a memory map table in employing a semiconductor memory device as a temporary memory space of a large capacity of data storage device. The memory map table indicates indexing information of data stored in a nonvolatile storage area.

Some exemplary embodiments of the present invention provide a flash memory structure with a high speed search for map information.

According to some exemplary embodiments of the present invention, a method of searching for a memory map table in a semiconductor memory device having a volatile memory area and a nonvolatile memory area together, comprises preparing a MAP RAM for storing, in the volatile memory area, map table data related to the nonvolatile memory area. At an initial power-up operation, while the map table data in a map storage area of the nonvolatile memory area is loaded into the MAP RAM, it is checked whether a logical address is searched for from the map table data. A physical address corresponding to the logical address is provided as an output when the logical address is being searched for.

The volatile memory area may be comprised of static random access memory cells. The nonvolatile memory area may be comprised of flash memory cells. The nonvolatile memory area may be constructed of NAND flash memory cells. The semiconductor memory device may be operationally coupled to a hard disk drive, to function as a cache memory of the hard disk drive. The map table data may be indexing data for which physical address and logical address for data stored in the nonvolatile memory area are mapped with each other.

According to some exemplary embodiments of the present invention, a semiconductor memory device having a volatile memory area and a nonvolatile memory area together comprises a MAP RAM included in the volatile memory area, for storing map table data related to the nonvolatile memory area. A logical address register is included in the volatile memory area, for storing a logical address. A physical address register stores a physical address corresponding to the logical address. A map search controller applies a physical address corresponding to the logical address to the physical address register when the applied logical address exists in the MAP RAM. Map table data existing in a map storage area of the nonvolatile memory area is transmitted to the MAP RAM when the applied logical address does not exist in the MAP RAM. It is checked, during the transmission, whether the logical address exists in the loaded map table data, and if it exists, the physical address corresponding to the logical address is applied to the physical address register.

In the method and device described above according to some exemplary embodiments of the present invention, a memory map table search time can be substantially reduced in employing a semiconductor memory device as a temporary memory for a large capacity of storage device. In addition, a read performance in a high speed map information search using a semiconductor memory device can be enhanced.

BRIEF DESCRIPTION OF THE DRAWINGS

The foregoing and other features and aspects of exemplary embodiments of the present invention will be apparent from the description below, as illustrated in the accompanying drawings in which like reference characters may refer to the same parts throughout the different views of the accompanying drawings, of which.

DETAILED DESCRIPTION OF EXEMPLARY EMBODIMENTS

Exemplary embodiments of the present invention now will be described more fully hereinafter with reference to FIGS. 3 and 4. This invention may, however, be embodied in many different forms and should not be construed as limited to the exemplary embodiments set forth herein.

Figure 2:
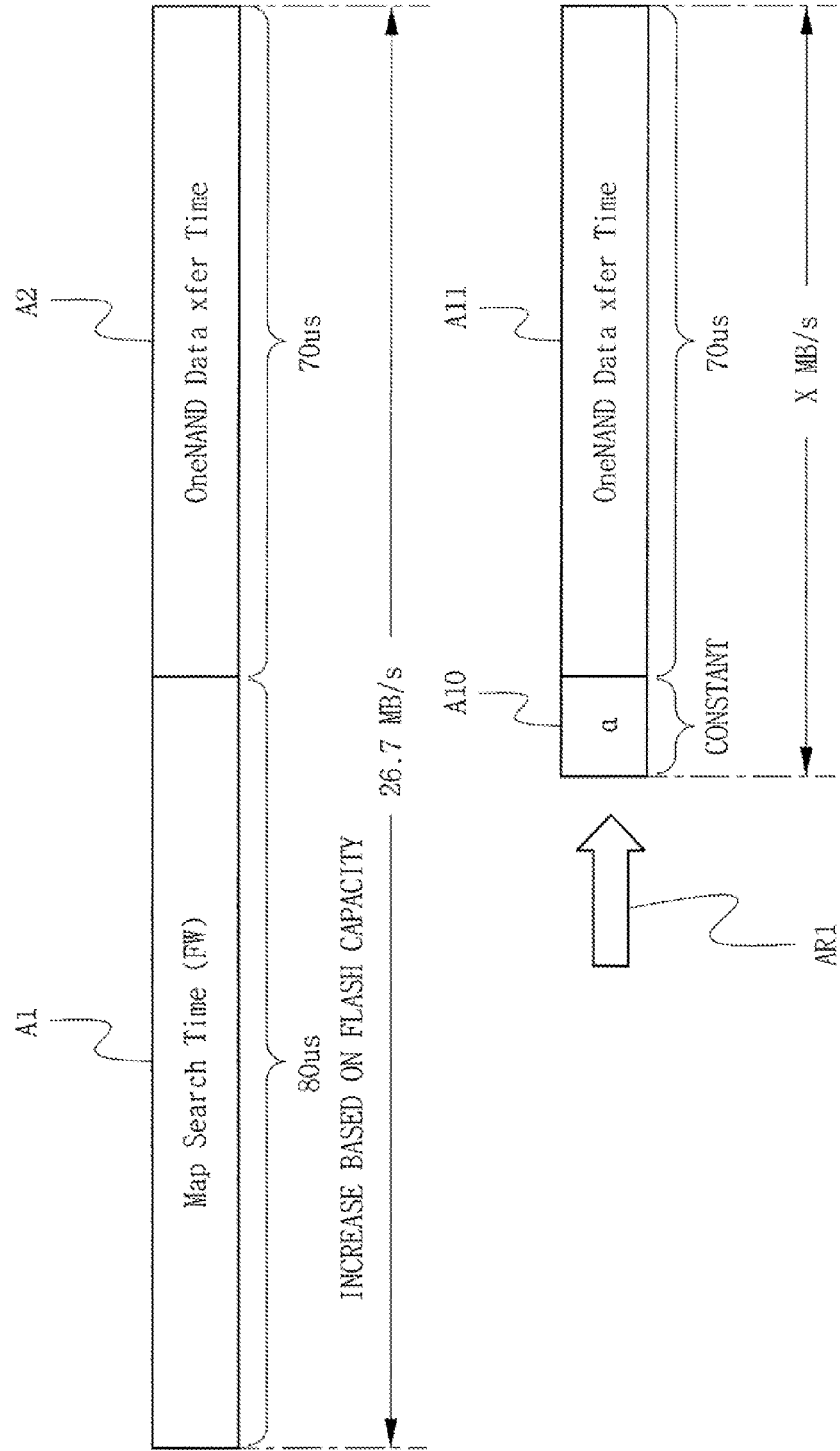
FIG. 2 offers a problem of increased map search time in a read time according to a conventional art.
Figure 3:
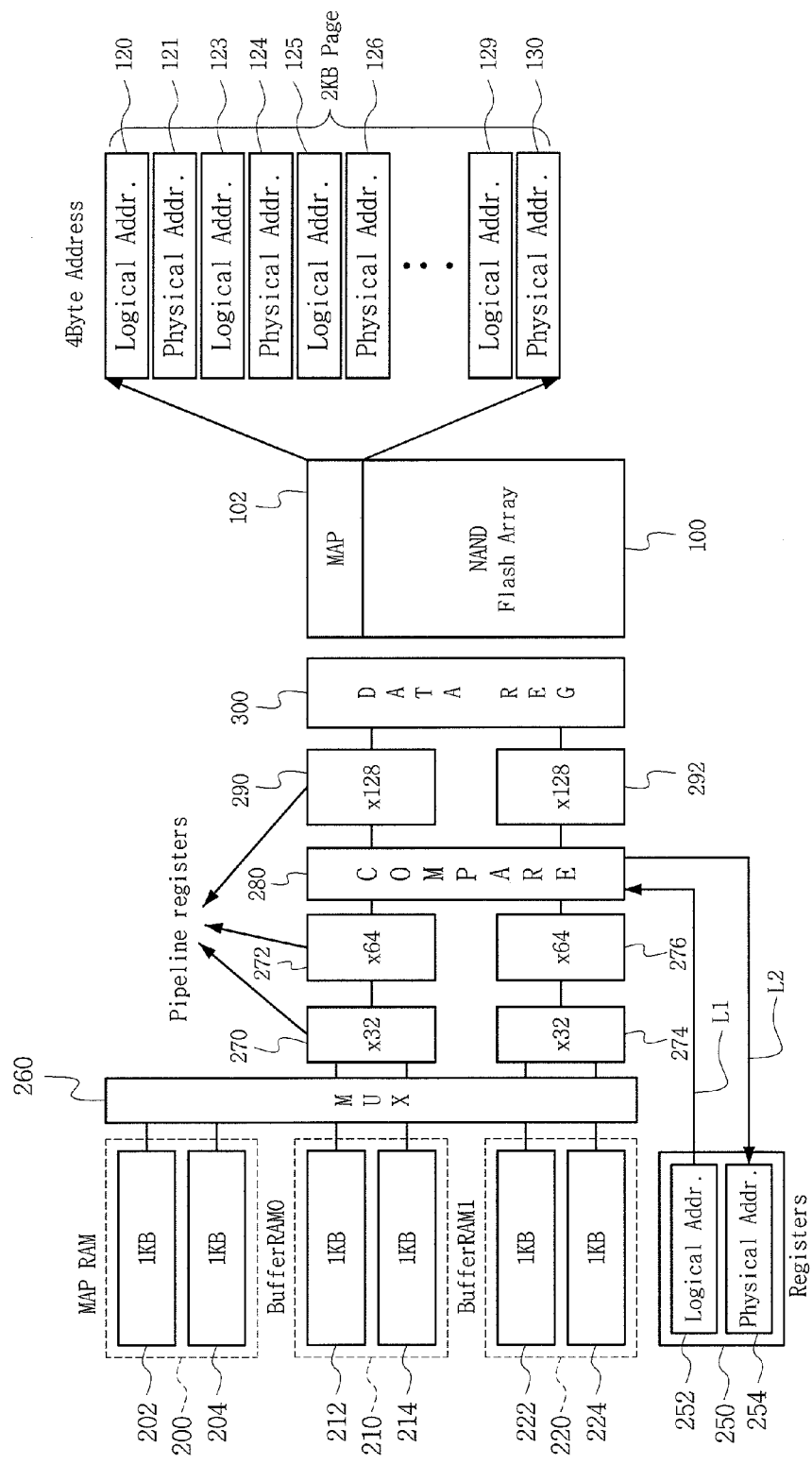
FIG. 3 is a block diagram of semiconductor memory device according to some exemplary embodiments of the present invention.

According to an exemplary embodiment of the present invention, it is provided a semiconductor memory device having a structure shown in FIG. 3, which is capable of lessening an interval A1 of map search time shown in FIG. 2 when being used as a temporary storage for a large capacity storage device, thereby maximizing or enhancing. A map search method can be improved as described below.

FIG. 3 is a block diagram of semiconductor memory device according to an exemplary embodiment of the present invention. In FIG. 3, a NAND flash array 100 having a map table storage area 102 and a data register 300 belong to a nonvolatile memory area. In a volatile memory area there is a hardware comparator 280, a MAP RAM 200, a logical address register 252, a physical address register 254, a buffer RAM 210 and a multiplexer 260. The nonvolatile memory area includes blocks constituting a flash memory, and the volatile memory area includes circuit blocks comprising an SRAM memory and an interface circuit block.

The MAP RAM 200 belongs to the volatile memory area, and stores map table data related to the nonvolatile memory area. Map table data of the map table storage area 102 in the NAND flash array 100 is stored in storage areas 202 and 204 of the MAP RAM 200 belonging to the volatile memory area.

Figure 1:
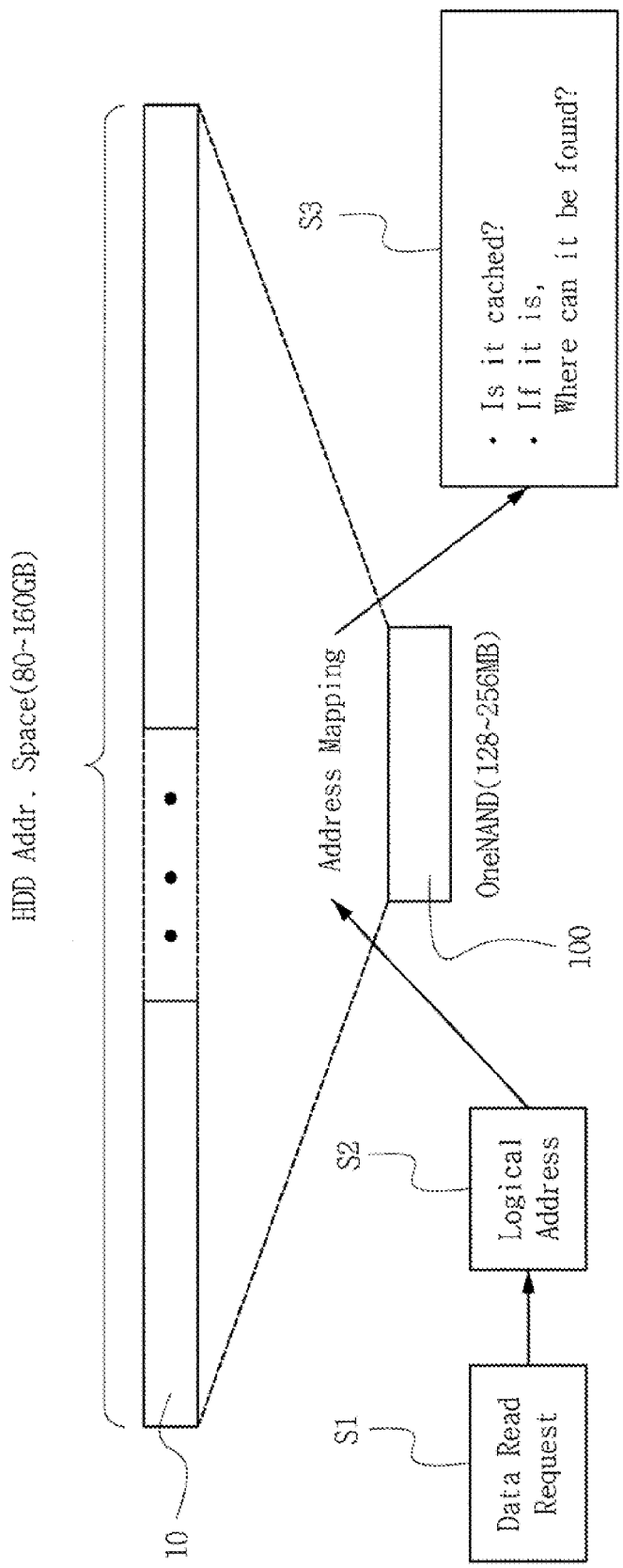
FIG. 1 illustrates an address mapping correlation between a large capacity storage device and a flash memory according to a conventional art.

The buffer RAM 210 in the volatile memory area stores normal data, except for the map table data of the NAND flash array 100. Normal data is data obtained from HDD 10 of FIG. 1.

In a register 250, a logical address register 252 belonging to the volatile memory area may include an SRAM cell that is configured as a flip-flop, and stores a logical address applied from the host. The logical address applied from the host is stored in volatile memory at the logical address register 252.

In the register 250, a physical address register 254 may include an SRAM cell that is configured as a flip-flip, and stores a physical address corresponding to the logical address. When the applied logical address exists in the MAP RAM, a physical address of a flash memory corresponding to the logical address is stored in the physical address register 254.

A multiplexer 260 performs a multiplexing function of the map table data and normal data.

The comparator 280 performs a comparison function to check whether the applied logical address is within the MAP RAM, or to check whether the logical address is in the map table data during a transmission of the map table data from the map storage area of the nonvolatile memory area to the MPA RAM.

Reference numbers 270, 272, 274, 276, 290 and 292 indicate pipeline registers for a change of data bit number.

A map search controller applies a physical address corresponding to the logical address to the physical address register when the logical address is in the MAP RAM. The map search controller transmits map table data from the map storage area of the nonvolatile memory area, to the MAP RAM when the applied logical address is not in the MAP RAM. During the transmission, the map search controller controls the comparator 280 to check whether the applied logical address is in the map table data and applies a physical address corresponding to the logical address to the physical address register when the applied logical address is in the map table data. The map search controller may include circuitry to provide for a read function.

In FIG. 3, in the map table storage area 102, map table data corresponding to one page is stored, and each logical address corresponds to each physical address in one-to-one correspondence. The NAND flash array 100 includes bit lines for sending and receiving data to/from a memory cell transistor of NAND cell unit (or cell string), and word lines, intersected to the bit lines, for controlling gates of memory cell transistors of the NAND cell unit and selection transistors.

Within a NAND flash array, a NAND cell unit may be formed in a p type well formed on an n type well. A NAND cell unit forming one string unit comprises a first selection transistor SST whose drain is connected to a bit line, a second selection transistor ST whose source is connected to a common source line, and 16, 32 or 64 memory transistors for which channels are coupled in series between a source of the first selection transistor SST and a drain of the second selection transistor ST. Each memory cell transistor constituting the NAND cell unit includes a floating gate formed by interposing a gate oxide on a channel region between the source and the drain, and a control gate formed on the floating gate through an interlayer insulation layer. Charge functioning as program data through a program voltage applied to the control gate CG is gathered in the floating gate FG.

Erase, write and read operations in operations of NAND flash are described as follows.

The erase and program (or write) operations are performed by using F-N tunneling current. For example, in the erase, a very high potential is applied to a substrate, and a low potential is applied to the CG. At this time, potential, which is decided by a coupling ratio of capacitance between CG and FG and between the FG and the substrate, is applied to the FG. When a potential difference between a floating gate voltage Vfg applied to the FG and a substrate voltage Vsub applied to the substrate is greater than a potential difference creating the F-N tunneling, electrons gathered in the FG moves to the substrate. Such operation lowers a threshold voltage Vt of memory cell transistor constructed of CG, FG, source and drain. Even when the Vt is sufficiently lowered and so 0 V is applied to the CG and the source, and when an appropriate level of voltage is applied to the drain and thus current flows, this may be called "ERASED" and is generally represented as a logic '1'.

In the write, 0V is applied to source and drain and a very high voltage is applied to CG. At this time, an inversion layer is formed in channel region and the source and drain both have a potential of 0V. When a potential difference applied between Vfg and Vchannel (0 V) becomes great enough to create the F-N tunneling, the Vfg being controlled by a rate of capacitances between CG and FG and between FG and the channel region, electrons move from the channel region to the FG and Vt increases. In this case, when a predetermined level of voltage is applied to the CG, 0V is applied to the source, and an appropriate level of voltage is applied to the drain, current does not flow and this may be called "PROGRAMMED" and is typically indicated as a logic '0'.

In the NAND flash array, a unit of page indicates memory cell transistors for which control gates are connected in common to one word line. Plural pages including a plurality of memory cell transistors are provided as a cell block, and one cell block unit generally includes one or plural cell strings per bit line. The NAND flash memory has a page program mode for a high speed programming. A page program operation has a data loading operation and a program operation. The data loading operation is to sequentially latch and store, in data registers, data of byte magnitude from input/output terminals.

Data register 300 is adapted to correspond to each bit line. The program operation is to write data stored in the data registers to memory transistors on a word line selected through bit lines.

In the NAND flash memory as described above, the read and program (write) operations are generally performed in a unit of a page, and the erase operation is performed in a unit of a block. An electron movement between a channel and an FG of the memory cell transistor appears in program and erase operations, while, in read operation, data stored in a memory cell transistor is read without influencing the data stored in the memory cell transistor after the program and erase operation.

In the read operation, a voltage (for example, read voltage) higher than a voltage (for example, ground voltage) applied to CG of a selected memory cell transistor is applied to CG of a non-selected memory cell transistor. Then, current flows or does not flow through a corresponding bit line according to a program state of the selected memory cell transistor. When a threshold voltage of programmed memory cell is higher than a reference value under a predetermined voltage condition, the memory cell is decided as an off-cell, thus charging a corresponding bit line to voltage of a high level. When threshold voltage of programmed memory cell is lower than a reference value, the memory cell is decided as an on-cell, and a corresponding bit line is discharged to a low level. A state of such bit line is finally read out as '0' or '1' through the data register 300 that may be called the page buffer.

Figure 4:
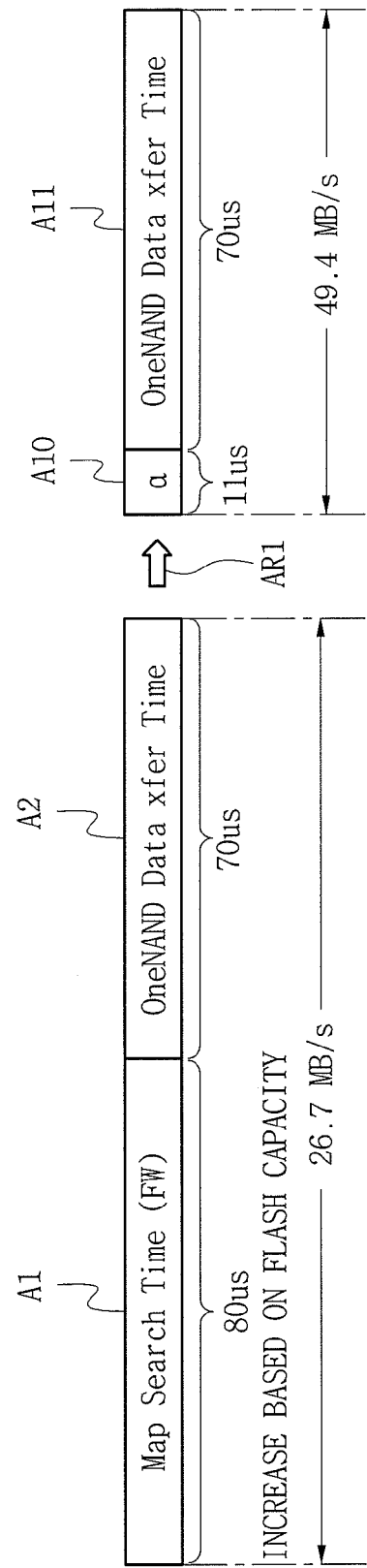
FIG. 4 comparatively illustrates an enhancement in read performance referred to FIG. 3.

FIG. 4 comparatively provides an enhancement in read performance referred to FIG. 3. In FIG. 4, a data transmission time is about 70 microseconds, and a table map search time is about 11 microseconds. A data transmission rate for the overall read operation of FIG. 4 becomes 49.4 MB/S. The table map search time A1 is substantially reduced to a table map search time A10 as shown in an arrow AR1, as compared to a conventional art, thereby increasing read performance of cache memory.

An example of the flash memory device supporting a cache read operation is disclosed in U.S. Patent Application Publication No. 2006/0224820, published on Oct. 5, 2006, which is hereby incorporated by reference. Such a flash memory device includes a nonvolatile memory core that is operationally connected to first/second buffer memory through a page buffer. The flash memory device of the convention art may be utilized in accordance with exemplary embodiments of the present invention.

A memory map table search method in a semiconductor memory device having a volatile memory area and a nonvolatile memory area together will be described referring to FIGS. 3 and 4, as follows.

According to an exemplary embodiment of the present invention, a MAP RAM 200 for storing map table data related to the nonvolatile memory area, a logical address register 252 and a physical address register 254 are adapted in the volatile memory area as illustrated in FIG. 3.

In read operation of data a host operationally connected to the semiconductor memory device of FIG. 3 first performs a memory map table search.

The host performs a setting of logical address related to read data into the logical address register 252 of the volatile memory area. This is applied to comparator 280 through a bus line L1. At this time, data of memory map table stored in the MAP RAM 200 is first transmitted to the comparator 280, sequentially through the multiplexer 260 and registers 270 and 272, and this is compared with logical address set in the logical address register 252. Through the comparison operation of the comparator 280, physical address corresponding to the logical address is provided to the physical address register 254 through bus line L2 when the set logical address is within the MAP RAM 200. Thus the host receives the physical address and recognizes a cache hit and then reads data corresponding to the physical address from the flash memory.

In a power-up initial operation the logical address is not in the MAP RAM 200. In case the set logical address is not searched within the MAP RAM 200, map table data existing in map storage area 102 within the nonvolatile memory area is loaded into the MAP RAM 200.

According to an exemplary embodiment of the present invention, during the loading of data into the MAP RAM 200, it is checked whether the set logical address exists in the loaded map table data. When the set logical address exists in the checking result, physical address corresponding to the logical address is provided to the physical address register 254 and simultaneously, or nearly simultaneously, the loading into the MAP RAM 200 is completed. The logical address and the physical address are stored in the MAP RAM 200 and simultaneously or nearly simultaneously, the physical address corresponding to the logical address applied by the host is stored in the physical address register 254.

Enhanced performance according to some of the exemplary embodiments of the present invention can be estimated as followings. Average performance of random read operation on 4 KB data may be represented by, for example, an average lookup time. The average lookup time is calculated as the following: Average lookup time=(hit rate×map search)+ (miss rate×miss penalty). Here, the hit rate is the ratio of cache hits to logical block reads and normally expressed as a percentage, and the miss rate is calculated by subtracting the hit rate from 100 and normally expressed as a percentage. Further, the map search time is time taken in transmitting page having stored-map information, the transmission being from data register 300 of the flash memory to the MAP RAM, and is assumed herein as 10 microseconds. The miss penalty indicates a time that it takes to transmit a new map page from the NAND flash array because a desired logical address has not been found in the MAP RAM and to perform a map search operation. Assuming that the hit rate is 95% and the miss rate is 5%, an average address lookup time becomes 11 microseconds, and performance, which may be increased seven times or more as compared to the existing 80 microseconds, can be obtained.

According to some exemplary embodiments of the present invention, in using a semiconductor memory device as a temporary memory of large capacity storage device, a memory map table search time can be substantially reduced. Read performance in a high speed map information search using a semiconductor memory device can be increased.

It will be apparent to those skilled in the art that modifications and variations can be made without deviating from the spirit or scope of the invention. For example, the configuration of MAP RAM and internal registers may be varied, or a comparison sequence of logical address may be changed. Accordingly, these and other changes and modifications are seen to be within the true spirit and scope of the invention.

What is claimed is:

1. A method of searching a memory map table in a semiconductor memory device having a volatile memory area and a nonvolatile memory area, the method comprising:
    loading map table data related to the nonvolatile memory area into a MAP RAM area of the volatile memory area using a host device operationally connected to the semiconductor memory device;
    checking whether a logical address is searched for from the map table data while the map table data in a map storage area of the nonvolatile memory area is loaded into the map RAM at an initial power-up operation using a map search controller; and
    providing, as an output, a physical address corresponding to the logical address, when the logical address has been searched using the map search controller.

2. The method of claim 1, wherein the volatile memory area is comprised of static random access memory cells.

3. The method of claim 1, wherein the nonvolatile memory area is comprised of flash memory cells.

4. The method of claim 1, wherein the nonvolatile memory area is comprised of NAND flash memory cells.

5. The method of claim 1, wherein the semiconductor memory device is operationally coupled to a hard disk drive, and the semiconductor memory device functions as a cache memory of the hard disk drive.

6. The method of claim 1, wherein the map table data is indexing data for which physical address and logical address for data stored in the nonvolatile memory area are mapped with each other.

7. A method of searching for a memory map table in a semiconductor memory device having a volatile memory area and a nonvolatile memory area, the method comprising:
    setting a logical address in a logical address register of the volatile memory area using a host device operationally connected to the semiconductor memory device;
    providing a physical address corresponding to the logical address to a physical address register of the volatile memory area when the set logical address is within a MAP RAM area of the volatile memory area using a map search controller;
    loading map table data existing in a map storage area of the nonvolatile memory area, into the MAP RAM area of the volatile memory, when the set logical address is not within the MAP RAM of the volatile memory area; and
    checking during the loading whether the set logical address is in the loaded map table data using a comparator, and when the set logical address is in the loaded map table data, providing a physical address corresponding to the logical address to the physical address register and completing the loading into the MAP RAM area of the volatile memory using the map search controller.

8. The method of claim 7, wherein the volatile memory area is comprised of static random access memory cells.

9. The method of claim 7, wherein the nonvolatile memory area is comprised of flash memory cells.

10. The method of claim 7, wherein the nonvolatile memory area is comprised of NAND flash memory cells.

11. The method of claim 7, wherein the semiconductor memory device is operationally coupled to a hard disk drive, and the semiconductor memory device functions as a cache memory of the hard disk drive.

12. The method of claim 7, wherein the map table data is indexing data for which physical address and logical address for data stored in the nonvolatile memory area are mapped with each other.

13. A semiconductor memory device having a volatile memory area and a nonvolatile memory area, comprising:
    a MAP RAM area of the volatile memory area, for storing map table data related to the nonvolatile memory area;
    a logical address register included in the volatile memory area, for storing a set logical address;
    a physical address register for storing a physical address corresponding to the set logical address; and
    a map search controller for applying the physical address corresponding to the set logical address to the physical address register when the set logical address is in the MAP RAM area of the volatile memory, transmitting map table data from a map storage area of the nonvolatile memory area to the MAP RAM area of the volatile memory when the set logical address is not in the MAP RAM area of the volatile memory, and checking during the transmission whether the set logical address is in the loaded map table data, and applying the physical address corresponding to the set logical address to the physical address register when the set logical address is in the loaded map table data.

14. The device of claim 13, wherein the map search controller comprises:
    a data register for reading the map table data in the nonvolatile memory area; and
    a comparator for determining whether the set logical address is in the MAP RAM area of the volatile memory.

15. The device of claim 13, wherein the map search controller further comprises:
    a multiplexer connected with the MAP RAM area of the volatile memory and a data storing buffer RAM, the multiplexer performing a data multiplexing; and
    a pipeline register coupled between the multiplexer and the comparator or between the comparator and the data register, the pipeline register performing an increase or decrease for the bit number of transmission data.

16. The device of claim 13, wherein the volatile memory area is comprised of static random access memory cells.

17. The device of claim 13, wherein the nonvolatile memory area is comprised of flash memory cells.

18. The device of claim 13, wherein the nonvolatile memory area is comprised of NAND flash memory cells.

19. The device of claim 13, wherein the semiconductor memory device is operationally coupled to a hard disk drive, and the semiconductor memory device functions as a cache memory of the hard disk drive.

20. The device of claim 13, wherein the map table data is indexing data for which physical address and logical address for data stored in the nonvolatile memory area are mapped with each other.

* * * * *